United States Patent [19]
Rutt

[11] Patent Number: 5,134,540
[45] Date of Patent: Jul. 28, 1992

[54] VARISTOR OR CAPACITOR AND METHOD OF MAKING SAME

[75] Inventor: Truman Rutt, Myrtle Beach, S.C.

[73] Assignee: AVX Corporation, New York, N.Y.

[21] Appl. No.: 758,623

[22] Filed: Sep. 12, 1991

Related U.S. Application Data

[62] Division of Ser. No. 191,123, May 6, 1988.

[51] Int. Cl.⁵ .................. H01G 4/10; H01G 7/00; C04B 33/34
[52] U.S. Cl. .................. 361/321; 29/25.42; 264/61
[58] Field of Search ............... 361/320, 321; 29/25.42; 264/61, 63, 56

[56] References Cited

U.S. PATENT DOCUMENTS

| | | | |
|---|---|---|---|
| 2,778,762 | 1/1957 | Eisler | 161/162 |
| 3,419,759 | 12/1968 | Hayakawa | 361/321 |
| 3,426,250 | 2/1969 | Kahn | 361/321 |
| 3,496,008 | 2/1970 | Haskins et al. | 117/215 |
| 3,794,707 | 2/1974 | O'Neill et al. | 264/56 |
| 3,798,762 | 3/1974 | Harris et al. | 264/61 X |
| 4,153,491 | 5/1979 | Swiss et al. | 264/63 |
| 4,289,719 | 9/1981 | McIntosh et al. | 264/61 |
| 4,598,107 | 7/1986 | Herron et al. | 264/63 X |
| 4,761,711 | 8/1988 | Hiremath | 361/321 |

Primary Examiner—Donald A. Griffin
Attorney, Agent, or Firm—Mark T. Basseches

[57] ABSTRACT

A method of manufacturing an improved varistor or capacitor, and the resultant improved varistor or capacitor is described. In accordance with the method the ceramic layers of the varistor are formed by providing at least two strata separated by a boundary layer which resists grain growth thereacross. The ceramic body is sintered under temperature conditions sufficiently low that grain growth within the strata defining the ceramic layers is restricted to the strata such that grain growth across the boundary material is minimized. By this method the ceramic layers have a predictable number of grain boundaries between adjacent electrodes.

4 Claims, 2 Drawing Sheets

VARISTOR OR CAPACITOR AND METHOD OF MAKING SAME

This application is a division of application Ser. No. 07/191,123 filed May 6, 1988.

BACKGROUND OF THE INVENTION

1. Field of the Invention

The present invention is directed to a varistor or capacitor, and more particularly to a monolithic ceramic device of the type described.

2. General Discussion

A ceramic varistor comprises essentially an intergranular barrier layer capacitor including a monolithic ceramic body having a multiplicity of electrode layers separated by ceramic layers. The odd numbered electrode layers, i.e. the first, third, fifth, etc., are electrically connected as are the even numbered electrode layers. The varistor is typically employed in shunting relation of an electronic circuit to be protected. It is the function of a varistor to provide a high resistance (and a degree of capacitance) when voltages impressed on the electronic circuit are maintained below a predetermined threshold voltage, and to provide a low resistance shunt when voltages exceed the threshold.

Heretofore, it has been exceedingly difficult to manufacture varistors having a predictable breakdown voltage, and particularly varistors which are rendered conductive at low voltages, i.e. 15 volts or less. The practical solution heretofore adopted by the industry has been to manufacture the varistor in a conventional manner, i.e. in the same manner as capacitors are conventionally manufactured utilizing known formulations compounded to function as varistors. Thereafter, the varistors produced are individually tested as to break down voltage and classified. It will be readily recognized that the individual testing or batch testing of varistors constitutes a complicating and costly step in the manufacture of varistors. A further desirable characteristic of a varistor is that when the same becomes conductive as a result of exposure to voltages beyond a threshold voltage, that the current carrying capacity of the varistor be as great as is possible. This characteristic is best realized where substantially the entirety of the ceramic components become simultaneously conductive thus providing the greatest current path between the various electrodes of opposite polarity. In conventional varistors, and even those varistors which have been classified to break down at a particular voltage, the break down does not occur uniformly, especially where the impressed voltage only slightly exceeds the threshold voltage. As a result, the ability of such varistors to function as an effective shunt is greatly reduced since conduction between opposed electrodes is focused at limited areas with remaining areas of ceramic continuing to be highly resistive.

It has been experimentally determined that the breakdown voltage of a varistor-ceramic formulation is a function of the number of grain boundaries of the ceramic grains intervening between adjacent electrode layers. The greater the number of boundaries between adjacent layers, the higher the break down voltage necessary to provide a conductive path. Conversely, in the event of a grain size such that grains of ceramic directly span the distance between adjacent electrodes, the device will exhibit break down or pass current at extremely low voltages. From the foregoing experimental findings, it will be evident that a highly undesirable condition results where the number of grain boundaries between adjacent electrodes varies greatly across the expanse of the ceramic layers. In such case, the break down voltage will be a function of and will occur at that area or those areas where there are concentrations of a limited number of grain boundaries. Where the break down is concentrated in a limited number of areas, it will be readily recognized that the current carrying capacity is substantially lower than would be the case if the break down occurred more or less uniformly throughout the entire area of the ceramic.

Efforts have been made to provide a ceramic having uniform grain boundary concentrations across the thickness of the ceramic. These efforts have heretofore been relatively unsuccessful on a commercial scale. Such efforts have included close control of the ceramic particle size embodied in the "green" ceramic layers; processing the ceramic under carefully controlled heating conditions during the sintering procedure; modifying sintering times, etc. As noted, none of the above methods have proven satisfactory.

A particularly acute problem arises when it is desired to provide a varistor having a relatively low break down voltage, i.e. in the order of 15 volts or less. The manufacture of such varistors to provide for break down at low threshold voltages and yet provide high current carrying capacity when the threshold voltage is exceeded has heretofore been very difficult.

SUMMARY OF THE INVENTION

The present invention may be summarized as directed to an improved method for manufacturing varistors and capacitors having predictable and readily repeatable break down or operating voltage characteristics. While it is considered that the principle utility of the instant invention lies in the production of varistors, it would be understood from the ensuing description that capacitors of the intergranular barrier layer type having improved characteristics will likewise benefit from the disclosed technology.

The invention is predicated in large measure on the discovery that ceramic grain growth is inhibited by the higher binder concentrations present at the upper surface of a green ceramic tape or stratum, such that when the tape or stratum is processed within controlled heating parameters, ceramic grains will not grow across the high-binder concentration boundary. By thus constructing a green ceramic layer which is comprised of two or more strata each of which strata incorporates a high-binder concentration at its upper extremity, and by processing such multi-stratum layer in such manner that the grain size does not extend across the boundary between adjacent strata, it is now possible to create a ceramic layer within the varistor wherein the number of grain boundaries within the layer is a function of the number of strata, and is thus controllable in accordance with the number of strata of which the layer is comprised.

The layer which is comprised of a number of strata may be fabricated by any of a number of different techniques. Specifically in addition to the tape stacking process briefly described above, a binder and ceramic formulation may be deposited as by screening or doctoring on a surface and the thus formed stratum may be overcoated with an organic ink as by swabbing. After drying of the organic ink layer, a further thickness of resin bonded ceramic may be overcoated atop the organic layer, dried, and the process repeated. In this instance, the thin layers of organic ink define the grain growth barriers which provide a predictable grain structure. Numerous other techniques for forming the layers comprising the various strata are known. These techniques include silk-screening, dipping, doctor-blading, spraying, etc.

It is accordingly an object of the invention to provide a varistor or capacitor comprised of one or more layers of ceramic, such layers being characterized by being formed of essentially discreet strata, the said strata having a predictable grain growth characteristic whereby the grain or grains of a given stratum cannot project across the boundary between the next adjacent stratum. In this manner, there may be formed a ceramic layer wherein the number of grains taken in a depth-wise direction may be accurately controlled. A further object of the invention is the provision of a method of forming a varistor or capacitor of the type described and the resultant product.

BRIEF DESCRIPTION OF THE DRAWINGS

Reference is now made to the accompanying drawings wherein.

DETAILED DESCRIPTION OF DRAWINGS

Figure 1:
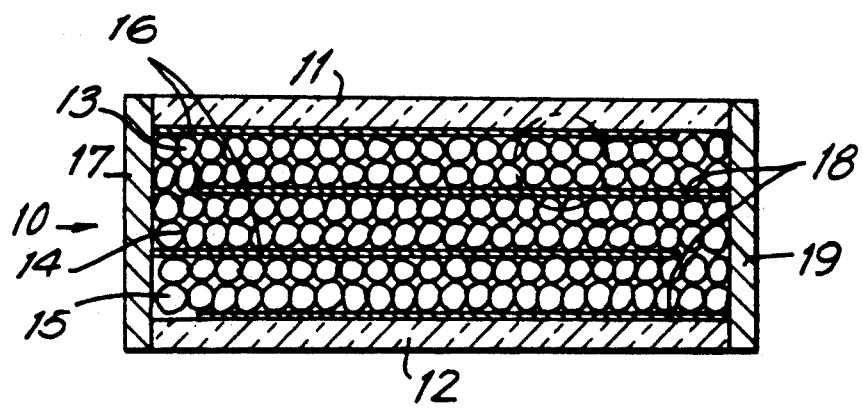
FIG. 1. is a schematic sectional view through a capacitor or varistor in accordance with the invention.

Referring now to FIG. 1, there is disclosed a schematic representation of a varistor 10 formed of a monolithic block of ceramic having internal electrodes separated by ceramic material. More particularly, the ceramic block or monolith includes upper and lower sealing or encapsulating layers 11, 12 respectively integrally formed with a series of ceramic layers, (three being shown in the illustrated embodiment) the ceramic layers being numbered 13, 14, and 15 respectively.

The varistor includes a pair of electrodes 16, 16 of a first polarity which are joined by a termination area 17. Electrodes 18, 18 of opposite polarity are joined by termination 19. The electrodes 16 are separated from electrodes 18 by the intervening dielectric layers 13, 14 and 15.

As thus far described, the construction of the varistor or capacitor is entirely conventional, the invention hereof relating to the nature of the dielectric layers 13, 14, and 15.

Figure 1A:
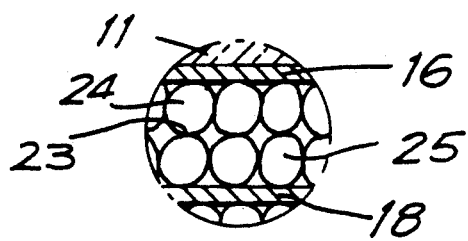
FIG. 1A is a magnified section of the circled component portion of FIG. 1.
Figure 1B:
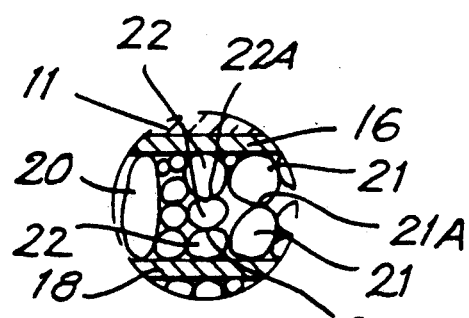
FIG. 1B is a view similar to FIG. 1A depicting the grain size distribution which is typical of prior art capacitors and or varistors.

As is schematically shown in FIG. 1B representing a typical prior art dielectric ceramic layer, the layer is comprised of a multiplicity of ceramic grains. The grains intervening between the electrode layers 16, 18 are randomly distributed in size in such manner that larger grains such as grain 20 may span the entire distance between the electrodes 16, 18 there thus being no inter-granular boundaries between the electrodes in the area occupied by grain 20. In a second area a pair of grains 21 may span the electrodes thus defining a single inter-granular boundary 21A in the area between electrodes 16 and 18 in registry with grains 21. In similar fashion, grains 22 are dimensioned such that three grains span the distance between the electrodes resulting in a structure in which there are two grain boundaries intervening between the electrodes.

A dielectric ceramic matrix in accordance with that illustrated in FIG. 1B is highly disadvantageous since as previously noted, the break down resistance of the layer will vary as a function of the number of intervening grain boundaries between the electrodes. Thus in the example of FIG. 1B a break down will occur first in the area of grain 20 before a break down would occur between grains 21, and in turn the area between grains 21 will become conductive before the area between grains 22, etc. It will thus be readily recognized that a varistor wherein the ceramic dielectric layer is of the consistency of the prior art type shown in FIG. 1B is undesirable in that the threshold voltage for break down will first occur in the areas of no grain boundaries or limited grain boundaries. Accordingly, the desired conductive nature of the varistor will be limited to those electrical current paths which register with grains such as grains 20, and perhaps 21 and accordingly, even when the varistor becomes conductive, the conductive carrying paths will be limited to the areas of fewest intervening grain boundaries.

In FIGS. 1 and 1A there is disclosed an idealized grain structure for the dielectric layers wherein the number of grain boundaries intervening between electrodes 16 and 18 are essentially equal throughout the entire area of the dielectric material. For purposes of simplicity of illustration, the dielectric components of FIGS. 1 and 1A are disclosed as providing a single grain boundary 23 between the strata defined by grains 24 and grains 25. As will be more fully explained hereinafter, as a practical matter a varistor will be formed with a predictable number of strata and hence a predictable number of grain boundaries, the number of boundaries sometimes being substantially greater than the single grain boundary structure illustrated.

Figure 2:
FIG. 2 is reproduction through a ceramic section taken by a scanning electron microscope (SEM).
Figure 3:
FIG. 3 is a further reproduction of an SEM photograph through a ceramic section magnified 2400 times.

By way of illustration, FIG. 2 comprises a photo micrograph through a section of ceramic formed in accordance with the invention. In the illustrated photograph, the layer 30 is comprised of five distinct strata 30A, 30B, 30C, 30D, and 30E whereby the layer 30 exhibits four grain boundary areas 31A, 31B, 31C, and 31D. In the photo micrograph of FIG. 2 there are illustrated void areas 32, 33 intervening between layer 30 and adjacent layers 34 and 35. These intervening areas can be subsequently be filled with electroding material, typically molten lead, in a known manner in accordance with one or more of the following U.S. Pat. Nos. 3,965,522; 3,679,950. Alternatively, the areas 32, 33 between layers 34 and 30 and 35 and 30 may, prior to conversion of the green ceramic to a sintered ceramic monolith be provided, as by screening or the like, with an electrode forming ink in the manner set forth, by way of example, in U.S. Pat. Nos. Re 26,421 of Jul. 2, 1968 and 4,347,650 of Sep. 7, 1982.

It is to be understood that the manner of forming a varistor or capacitor from the once formed green ceramic layers 30 is conventional and well known to the art, the present invention being directed to the concept of and manner of formation of layers 30 which will, following sintering, provide a predictable and regular number of grain boundaries between intervening electrode layers.

DETAILED DESCRIPTION OF MANUFACTURING METHODS

Central to the method of the instant invention is the concept of forming each of the respective green dielectric layers of the varistor of a series of strata each stratum of which is provided at its major surfaces with a boundary forming material which functions to inhibit grain growth of the ceramic across the boundary during the sintering. A further aspect of the method is carrying out a sintering procedure at a temperature sufficiently low, and for time period sufficiently short that the ceramic grains do not grow across the respective boundaries between the strata. It is, for example, possible utilizing a green ceramic structure in accordance with the invention to produce a monolithic ceramic structure having the random grain growth diagrammatically illustrated in FIG. 1B by sintering under temperatures sufficiently high that the grains will eventually break down the resistance of the barriers and become randomly sized. Thus, to achieve the desired results of the invention it is necessary, in addition to providing barrier effects at the major surfaces of the strata to process the green ceramic preform in a manner which will preserve the barrier effect. Since skilled workers in the art of ceramic capacitor fabrication are well aware of the interplay of time, temperature, and formulation factors in relation to grain size, the skilled worker familiarized with the instant disclosure will be readily able to derive fabricating parameters which will assure the effective functioning of the barriers.

EXAMPLE 1: VARISTOR STRUCTURE FABRICATION

A water slurry was made by milling 65% by weight zinc oxide with 35% by weight water. A small addition of dispersant (approximately 0.5% to 1.0% by weight of Rohm and Haas T-901) was added to reduce viscosity. The slurry was milled for approximately five hours in a vibro-energy mill made by SWECO CORPORATION. The milling operation was effected using ⅜ inch zirconia milling media. Milling was continued for approximately five hours following which 20% by weight of a commercially available acrylic latex binder was added (Rohm and Haas HA-12) to form the mixture into a thin paint. The paint was applied to a stainless steel belt coated with a thin lethechin coating to facilitate release of the film after drying, the film being formed to a thickness of approximately one mil after drying. During the drying procedure a degree of segregation of the latex binder was observed, the binder being concentrated at the top drying surface of the film. The degree of concentration of the binder was found to be a function of drying time, longer drying times favoring increased surface concentrations of binder.

The dried film was cut into rectangular pieces and stacked in groups of five. Increments of groups of five were stacked to form a structure, the physical formation of the green ceramic preform being effected in accordance with the procedures outlined in the previously cited U.S. Pat. Nos. 3,965,552 and 3,679,950. The preform was then consolidated by bonding of the stacks under heat and pressure. Bonding was effected by subjecting the preform under pressure of between 1500 to 2500 psi and temperature of 113 degrees centigrade. The individual unit structures were then cut from the stack. In accordance with such patents a so called pseudo ink is applied between intervening layers of the compressed strata with the psuedo ink formulation emerging at opposite sides of the individually cut structures in the manner described.

The cut preform structure was heated for a period of 3 hrs at 370° C. to decompose and remove binder and dispersants from the ceramic formulation and from the pseudo ink. A slow heating rate (12 hrs to reach temperature) was used to slowly decompose the binder without disruption of the structure. The resultant structures were then fired at 1400° C. for one hour to sinter the ceramic.

FIG. 2 of the instant application shows the grain structure of the resultant ceramic monolith. As is apparent from the enlargement, each layer 30 of the monolith was comprised of five strata each stratum being composed essentially of a single ceramic grain extending throughout the entire depth of the stratum, the grains of each stratum terminating at a boundary defined by the next adjacent stratum. Grain size is shown to be substantially constant, the structure of each layer including four grain boundaries between the void areas 32,33.

This structure and varistors manufactured in accordance with the invention were heated between 1000° to 1100° centigrade in the presence of Bi2O3 in order to effect deposits of such substance in the grain boundaries, The purpose of such procedure is to facilitate observance of the grain structure by an SEM, the bismuth also functioning to enhance the varistor properties. The heating was done before end termination.

EXAMPLE II

A varistor ceramic slurry formulation was formed using 65 parts by weight of ceramic powder comprised essentially of zinc oxide containing one or more small additions chosen from the list of Bi, Co, Mn, Ti, Cr, Si, Al, K. This mixture was milled in water with 35% by weight water utilizing the dispersant and percentage of dispersant as set forth in Example 1. Milling of the mixture was effected for a period of 18 hours in the manner set forth in Example 1. Relative to the weight of ceramic, 18 parts by weight of Rohm and Haas HA-12 and 2 parts by weight of Rohm and Haas HA-16 binders were added, the resultant slurry having a viscosity of about 20-30 cps. Films were formed of the resultant slurry as previously described, the dried films having a thickness of approximately 0.72 mils. The films were employed to define strata in the manner previously described. In this instance, the varistors were formed by screening between adjacent stacked layers areas of platinum electrode paste in accordance with a procedure set forth by way of example in U.S. Pat. No. Re. 26,421. The ceramic layers defining the varistors were formed of three strata and four strata respectively. The stacked green varistors were then heated to remove binder and dispersants as in Example 1. They were thereafter fired at 1180 degrees centigrade for four hours and treated as described in Example 1. In the specific constructions cited, the finished varistor body made with three strate had the following dimensions: 0.118 in. distance between terminated ends; 0.059 in. width; 0.033 in. thickness. The Thickness of each of the layers 30 of the preform was approximately 0.0019 in., the specific preform including 5 operative layers (15 total strata), and 3 electrodes of each polarity. The finished varistor body made with four strata per layer had essentially the same dimensions with the thickness of each of the layers 30 of the preform being approximately 0.0021 in. thick. It also had 3 electrodes of each polarity.

A number of varistors fabricated in the manner defined were tested as to capacitance and percent dissipation factor, using a 1 volt RMS, 1 Khz test signal. The units fabricated with three strata had an average capacitance of 3.94 nf, and 8.65% DF. The units fabricated with four strata had an average capacitance of 3.49 nf, and 7.30% DF.

Breakdown voltage will be defined as the voltage impressed upon the units for a current of 1 ma. The units utilizing three strata layers had an average breakdown voltages of 7.43 volts. The units with four strata layers had an average breakdown of 8.28 volts.

As a control, varistors were fabricated from the formulation set forth in the instant example, the sole difference in fabrication techniques being that each of the ceramic bodies of the control varistors was fabricated by employing as the ceramic layers 30 a single sheet of the processed ceramic having a thickness approximately equal to the combined thickness defined by layers 30 which were comprised of the three strata. The dried tape thickness was approximately 2.2 mils. Control varistors were formed from the control ceramic sheets in exactly the same manner as described in respect of the varistors manufactured from the multi-stratum layers. The control varistors were tested as to capacitance and percent dissipation factor as describe. the average capacitance was 4.68 nf, and 20.1% DF. The average breakdown voltage was 3.74 volts.

For a limited voltage-current range, the current (I) through a varistor is proportional to the applied voltage (V), raised to some power alpha ($\alpha$). That is, $I \sim V\alpha$. A large value for alpha is desirable, since then the device conducts a large current with a very small rise in voltage over breakdown, providing an effective shunt to protect other circuit elements. Over a limited current range, an effective alpha can be defined as $$\alpha_{eff} = \frac{\Delta \ln(I)}{\Delta \ln(V)}.$$

In the following tests current pulses of short duration were applied to the varistors and the voltage measured. The current pulses were short in duration to prevent appreciable heating of the units. Following are the effective values of alpha for the three stratum, four stratum, constructions and the control varistors, calculated for different current ranges.

| VARISTOR | CURRENT RANGE USED TO CALCULATE $\Delta \ln$ (I) | EFFECTIVE ALPHA |
|---|---|---|
| Control | 0.5 to 1.0 amp | 11.7 |
| | 0.5 to 10.0 amp | 4.8 |
| | 0.5 to 18.8 amp | 3.2 |
| Three Stratum | 0.5 to 1.0 amp | 19.8 |
| | 0.5 to 10.0 amp | 8.6 |
| | 0.5 to 18.8 amp | 4.7 |
| Four Stratum | 0.5 to 1.0 amp | 34.0 |
| | 0.5 to 10.0 amp | 10.3 |
| | 0.5 to 18.8 | 5.8 |

The better properties of the stratum constructed units relative to the control units can be understood in terms of the microstructures. A reproduction through a ceramic section of the three stratum constructed varistor taken by a scanning electron microscope (SEM) may be compared with a ceramic section of the control varistor taken by SEM.

The control varistor has some large grains and regions of few grain boundaries which allow 1 ma of current to flow at a low voltage. The stratum constructed units have a more uniform grain structure which results in a higher effective alpha over all current ranges tested.

With the multi-stratum construction it was easy to change the breakdown voltage by changing the number of strata and grains. Changing the breakdown voltage of the control construction would involve more difficult, less directly definable, process changes to modify average grain size.

EXAMPLE III

A zinc oxide varistor formula in accordance with Example 2 was prepared as thin sheets approximately 0.8 mils thick. The ceramic layers defining three and four stratum varistors were formed in the manner previously described in Example I. The varistor monoliths were processed to form varistors by injecting lead into the various void areas remaining following votalization of the pseudo ink and were terminated in the manner set forth in the above referenced U.S. patents.

The resultant varistors were tested against a control following the testing procedures set forth in accordance with Example II. Varistors in which the layers of ceramic were fabricated by multiple sub-layers or strata were again found to be markedly superior in each of the test particulars as compared to a control batch formed in identical manner by wherein the layers of green ceramic were defined by a thicker single film the total thickness of which approximately equaled the plurality of stacked films.

Fractured samples of the ceramic bodies of the control varistors and those manufactured in accordance with the process of the instant application were subjected to SEM inspection. In the examples fabricated in accordance with the disclosure of the instant application, grain growth within the layers was found to correspond closely to the configurations of the strata defining the layer, and hence a predictable number of grain boundaries between electrode areas was found to exist, An inspection of the control sample evinced a wide variation of grain sizes and the number of grain boundaries between electrode adjacent areas.

The four stratum construction had a predictably higher breakdown voltage than the three stratum construction, and again gave an easier method of controlling breakdown voltage than the control construction.

EXAMPLE IV

In this example a zinc oxide varistor formula in accordance with Example II was prepared as thin sheets approximately 0.70 mils thick. The films were prepared in accordance with Example II, with an exception in binder levels. Only 15 parts by weight total of binders were added.

Multi-stratum layers were constructed from the thin films in two ways. In the first method the as formed sheets were slacked and laminated. In the second method a very thin layer of Rohm and Haas HA-16 binder was applied to one surface of each tape and dried before stacking and lamination. The binder was applied by a cotton swab using 90 parts by weight water with 10 parts by weight of the HA-16 binder. The binder itself contained approximately 46 weight percent of latex organic. The laminated strata of both methods were then fired, and thermally treated as in Example II.

SEM analysis showed that the swabbed on binder acted as an effective grain growth barrier. The as cast tape did not have sufficient binder segregation to limit grain growth to within the tape strata.

EXAMPLE V

In this example samples of the thin films prepared in Example IV were used. As discussed in Example IV, the as cast film did not have sufficient binder segregation to limit grain growth to within the tape strata. Stratum were constructed from the thin films by stacking and laminating. Before stacking and laminating one surface of each film was sprayed using an airless paint sprayer with a mixture of 90 parts water with 10 parts Lanthanum Carbonate. The laminated multi-strata were then fired and thermally treated as in Example II.

SEM analysis showed that the thin coating of Lanthanum Carbonate acted as an effective grain growth barrier.

EXAMPLE VI

In this example a ceramic slurry formulation was prepared in accordance with Example II. The slurry was not cast as previously described. Multi-stratum layers were constructed by spraying thin ceramic films with an airless paint sprayer. Each film was dried and then the top surface coated with an organic film as described in Example IV before spraying the next thin ceramic film. A glass plate was used as a substrate for supporting the multi-stratum layer during build up. The build up was removed, fired and treated as in Example II.

SEM analysis showed that grain growth was essentially limited to within the multi-strata sprayed films.

In addition to the tape stacking and spraying techniques found to be effective in producing ceramic layers having predictable grain sizes and hence predictable numbers of grain boundaries, similar results are achievable using doctor techniques, screening techniques, roller spreading techniques, etc. While at present, the tape stacking technique is considered to be the "best mode" of forming the multi-stratum layers, the invention is not to be construed as limited to any specific technique or techniques, since numerous means of forming multi-stratum layers with intervening grain growth barriers are possible. Rather, the invention is to be broadly construed to encompass the generic concept of providing ceramic layers wherein the number of grain boundaries within the layer are controlled within statistically predicatable limits through the use of barriers formed at the major surfaces of the strata forming the ceramic layer. The examples have used organic resins for bonding of ceramic in the ceramic stratum during buildup of the structure. This should not be construed as being essential. This is demonstrated by the structures being in a binderless state after the binder burnout operation but before sintering. It is anticipated that even material deposition techniques such as sputtering, or CVD could be used to produce stratum layers of high green density bonded by thin layers of low green density or other barriers at the stratum interfaces, and which could then be fired to produce the desired grain structures. The method is of course dependant on processing the green ceramic bodies in such a manner that grain growth across the adjacent strata does not develop, it being understood that notwithstanding the barriers, processing at unduly high temperatures or for overly extended periods will induce such trans-barrier growth.

While the present invention has been described in conjunction with the fabrication of varistors, it will be readily recognized by those skilled in the art that many of the advantages which provide varistors of superior quality will likewise be useful in the fabrication of other devices and structures. For example, the number of grain boundaries between adjacent electrode layers is also of significance in capacitors such as intergranular barrier layer capacitors, such capacitors being fabricated of ceramic materials which have been doped to render the same semi-conductive and wherein the grain boundaries are relied upon to provide the insulative factor.

By way of another example, the number of grain boundaries between adjacent electrode layers is also of significance in barium titanate positive temperature coefficient of resistance thermistors. Such thermistors have been doped to render the same semi-conductive and wherein the grain boundaries are relied upon to provide the resistance factor.

In the described examples and microphotographs forming a part of the instant application the grain structures in the ceramic strata are shown as having grown through the full depth of the strata terminating at the barriers defining the extremities of the strata. Such a structure provides the most predictable results. However, it is within the contemplation of the present invention to subject the ceramic material to a sintering procedure wherein more than a single grain is grown depthwise through each stratum. Such a result may be achieved by sintering at lower temperatures or shorter periods. Under such circumstances, the barrier continues to function to prevent grain growth thereacross, i.e. grain growth which penetrates through adjacent strata.

It is contemplated that numerous barrier materials may be employed to restrain trans-stratum grain growth, and accordingly the invention is not to be considered to be limited in this regard. It should be borne in mind, however, that the nature of the barrier and the thickness dimension thereof must be selected such that the grains of a first stratum are in direct boundary to boundary contact with the grains of adjacent strata rather than providing an excessive porosity or spacing between the layers for the given application.

As will be evident to skilled workers in the art familiarized with the instant disclosure numerous variations in details of methodology and structure will occur from the examples specifically herein set forth. Accordingly, the invention is to be broadly construed within the scope of the appended claims. Also, while the illustrated examples are essentially planar in structure, various topological transformations such as bending, flexing, stretching, etc. of the structures are to be construed as being within the scope of the appended claims, as is the formulation of strata in concentric cylindrical configurations etc.

I claim:

1. A ceramic varistor or capacitor including a dielectric layer or layers having electrodes covering at least major portions of the opposite surfaces of said layer or layers, made by the method of forming said layer or layers of a plurality of green ceramic strata, adjacent said strata having a grain growth barrier interposed therebetween, and sintering said layer or layers under heating temperatures sufficiently low to minimize the growth of grains across said barriers.

2. A monolithic ceramic varistor or capacitor comprising alternate layers of ceramic material having electrodes interposed therebetween, adjacent said electrodes being electrically isolated from each other and alternate said electrodes being connected to each other, made by the method of forming a green ceramic preform of a plurality of stacked layers of green ceramic, said layers comprising a plurality of discrete strata said strata including ceramic particles in an organic binder, the ratio of binder to ceramic in said strata being greater at the surfaces of said strata than at the interior of said strata, thereafter heating said preform to drive off said binder, and thereafter sintering said preform at sintering temperatures sufficiently high to fuse said ceramic particles into grains, said termperatures being sufficiently low as to resist the formation of grains merging across the boundaries between adjacent said strata.

3. In a monolithic ceramic varistor or capacitor comprising at least one ceramic dielectric layer, the opposed surfaces of said layer being covered by conductive electrodes, the improvement which comprises said layer being comprised of at least two discrete strata, each of said strata being comprised of grains of ceramic material, said layer being substantially free of ceramic grains extending between the said opposed surfaces of said layer.

4. As a new article of manufacture, a preform for fabricating a ceramic varistor or capacitor comprising at least one green ceramic layer, electrode forming means on the opposed surfaces of said layer, said layer being comprised of a plurality of green ceramic strata, said strata having grain growth barrier means interposed therebetween for resisting the growth of ceramic grains across said barrier during sintering of said layer.

* * * * *